UNITED STATES PATENT OFFICE.

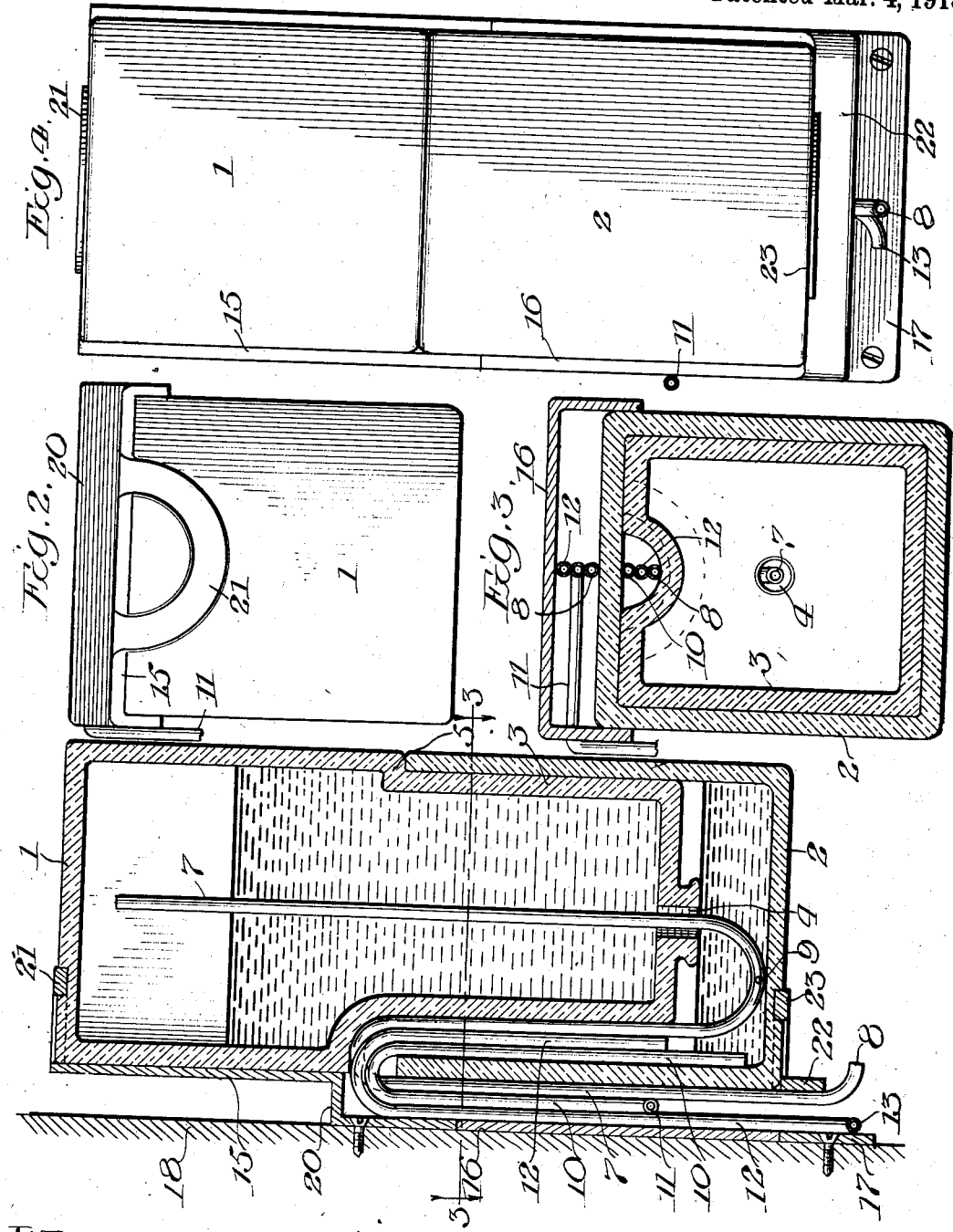

JULIAN G. GOODHUE, OF CHICAGO, ILLINOIS.

LIQUID RESERVOIR AND FEEDING DEVICE.

1,054,915.  Specification of Letters Patent.  Patented Mar. 4, 1913.

Original application filed February 23, 1910, Serial No. 545,390. Divided and this application filed February 7, 1911. Serial No. 607,111.

*To all whom it may concern:*

Be it known that I, JULIAN G. GOODHUE, a citizen of the United States, residing at Chicago, in the county of Cook and State of Illinois, have invented a certain new and useful Improvement in Liquid Reservoirs and Feeding Devices, of which the following is a full, clear, concise, and exact description, reference being had to the accompanying drawings, forming a part of this specification.

My invention relates to liquid reservoir and feeding apparatus, that is to say apparatus for holding a liquid and permitting the same to be fed properly and automatically as may be required.

Prominent objects of the invention are to provide a simple, practical and effective type of apparatus of this kind, to arrange to maintain a uniform liquid level for feeding, to arrange for the easy and rapid refilling of the apparatus, and to accomplish the foregoing and other desirable results in a simple and expeditious manner.

This application is a division of an application filed by me February 23, 1910, Serial No. 545,390, disinfectant apparatus. The subject matter of said earlier application is a disinfecting apparatus operable by the door of a toilet room to disinfect a lavatory bowl therein, and to such end embodying a reservoir apparatus for the disinfecting liquid which is made the subject of the present application.

In the accompanying drawings Figure 1 is a vertical section of an apparatus embodying my present invention, together with means for supporting the same in proper position; Fig. 2 is a plan view of the same; Fig. 3 is a cross section taken on line 3—3 in Fig. 1; Fig. 4 is a front elevation of the apparatus.

The arrangement shown comprises an upper reservoir or receptacle 1, and a lower reservoir or receptacle 2, which may be of any suitable material, as for example porcelain or glass, or the like. The upper reservoir or bottle 1 is inverted and has a somewhat contracted lower portion 3 in the bottom of which is the orifice or mouth 4. There is a circumferential shoulder 5 at the point of connection between the upper and lower portions of the receptacle. The lower receptacle 2 receives the contracted end 3 of the upper one and serves to support the upper one by coming into contact with the annular rim or shoulder 5. A pipe or tube 7 is arranged within the upper receptacle 1 and extended down through the mouth thereof and thence up on the outside of the narrow or contracted portion 3 of said receptacle between the same and the receptacle 2, and thence down on the outside of the latter, terminating at an end or orifice 8 below the receptacle 2. This pipe or tube 7 obviously affords communication with the upper portion of the interior of the upper receptacle 1. Said pipe or tube 7 is provided with an aperture 9 at its lower portion or bend in the receptacle 2. Another pipe or tube 10 extends from the lower portion or substantially the bottom of the receptacle 2 upwardly and thence out of the receptacle 2, and downwardly at the side of the same, terminating in an opening or end 11. Still another or third pipe or tube 12 is extended from the interior of the receptacle 2 above the bottom of the mouth 4 of receptacle 1, upwardly and thence out and down, terminating at an end 13.

Liquid is introduced into the reservoir or receptacles, it will be seen, and will fill the lower receptacle to the edge of the mouth 4, and will then fill the upper one, so far as possible, overflowing if too much is introduced, out of said receptacle by way of the pipe or tube 7. Normally, however, the level of liquid in the upper receptacle is below the top of the tube 7. The device is especially adapted for use in connection with apparatus by which the liquid is withdrawn either intermittently or otherwise, and this withdrawal occurs through the pipe or tube 10. For instance, some form of suction or pneumatic apparatus may create a partial vacuum at the end 11 or the end of a continuation of said tube, and thereby induce a flow of liquid from the receptacle 2 out through said tube 10. As this takes place the liquid withdrawn from the lower receptacle 2 will be replaced by liquid from the upper receptacle 1, an automatic feed thus taking place between the two receptacles, and the level in the lower receptacle, which is the feed receptacle, being always maintained at the same level.

When the liquid is exhausted or substantially so, from the two receptacles, the apparatus may be recharged or refilled by means of a pipe 12, which is understood to be connected with or capable of being connected with some suitable liquid feeding or pumping apparatus. The air in the upper receptacle 1 is exhausted through the pipe 7 to permit this recharging or refilling of the apparatus. In fact, such an exhaustion of air, simultaneously with the refilling, is essential to the latter by creating a partial vacuum at the top of the receptacle, into which the liquid will tend to rise.

The exhaustion of air, through the pipe 7 may be done by any desired arrangement. I prefer, however, to use a special form of pump designed by me, and made the subject matter of an application filed by me Feb. 23, 1910, Serial No. 545,393. Such pump is adapted in its operation to pump liquid into the lower receptacle 2 through the pipe 12, and also to exhaust air from the upper receptacle 1 through the pipe 7. This allows the quick and easy refilling of the device without opening it or removing any of its parts. The opening 9 in the pipe 7 admits a small amount of liquid, which serves as a seal for the air in the upper receptacle 1. In the refilling operation this liquid is withdrawn, but it is insufficient to interfere with that operation, and when it is over, more enters the tube 7.

In my said other earlier application I have shown a nozzle or spraying device capable of being used in connection with a reservoir, and feeding apparatus, such as herein set forth, which nozzle however, is not shown herein nor made a part of this invention, being the subject matter of another divisional application, filed of even date herewith. Such nozzle device is adapted to be engaged with the pipe 10 by an extension of the end 11, so as to receive liquid from the reservoir apparatus of this application. The general operation of said nozzle is to withdraw liquid from the reservoir apparatus herein at intervals as required for disinfecting purposes. I do not, however, wish to limit myself to the use of the apparatus herein, either to the aforesaid pump or nozzle device.

As an arrangement for supporting this apparatus, I have shown a bracket arrangement comprising three sections of bracket, 15, 16 and 17, adapted to be secured to an upright wall or support 18. The upper section 15 is made with an angular portion 20 above the curved portions of the pipes coming out from the receptacle 2. This section 15 also has a curved portion 21, substantially semi-circular in form, adapted to engage a corresponding groove in the top of the upper receptacle 1. The wall portion or section 17 has a belt or collar portion 22 surrounding the pipes, and is also provided with a semi-circular part 23, to fit in a corresponding groove in the bottom of the receptacle 2.

It will be understood that changes and modifications can be made without departing from the spirit of the invention.

What I claim is:

1. A device of the class specified, comprising upper and lower coöperating liquid holding vessels and pipes 7 and 12, the former extending from outside of said vessels to the interior of the top of the upper vessel, and the pipe 12 extending from the outside of said vessels into the lower one thereof.

2. A device of the class specified, comprising liquid holding vessels, arranged to maintain a constant liquid feed level, and pipes 7 and 12, the pipe 7 being extended from the air chamber of said vessels to the outside thereof and the pipe 12 being extended from the reservoir portion of said vessels to the outside thereof, the pipe 7 having an aperture for the admission of liquid.

3. A device of the class specified, comprising upper and lower coöperating liquid holding vessels and pipes 7 and 12, the former extending from outside of said vessels to the interior of the top of the upper vessel, and the pipe 12 extending from the outside of said vessel to the lower one thereof, the pipe 7 having an aperture for the admission of liquid.

4. A device of the class specified, comprising upper and lower liquid holding vessels 1 and 2, respectively, the vessel 1 having its lower portion arranged within the vessel 2, and having a mouth at its lower end, a pipe 7 extending downwardly from the upper portion of the vessel 1 through the mouth thereof, and thence upwardly in the vessel 2 and down the outside thereof, and a second pipe 12 extending from within the vessel 2 to the outside thereof.

5. A device of the class specified, comprising upper and lower liquid holding vessels 1 and 2, respectively, the vessel 1 having its lower portion arranged within the vessel 2, and having a mouth at its lower end, a pipe 7 extending downwardly from the upper portion of the vessel 1 through the mouth thereof, and thence upwardly in the vessel 2 and down the outside thereof, and a second pipe 12 extending from within the vessel 2 to the outside thereof, the pipe 7 having an aperture 9 for the admission of liquid.

6. A device of the class specified, comprising upper and lower liquid holding vessels 1 and 2 respectively, the vessel 1 having its lower portion arranged within the vessel 2 and having a mouth at its lower end, a pipe 7 extending downwardly from the upper portion of the vessel 1 through the mouth thereof and thence upwardly in the vessel 2 and down the outside thereof, and a second pipe 12 extending from within the vessel 2 to the outside thereof, and a third pipe extending from the lower portion of the receptacle 2 to the outside of said receptacle.

7. A device of the class specified, comprising liquid holding vessels, arranged to maintain a uniform feeding level, and tubes or pipes for withdrawing air from and supplying liquid to said vessels, and a pipe for withdrawing liquid from said vessels for use.

8. A device of the class specified, comprising liquid holding vessels, arranged to maintain a constant liquid feed level, and pipes 7 and 12, the pipe 7 being extended from the air chamber of said vessels to the outside thereof and the pipe 12 being extended from the reservoir portion of said vessels to the outside thereof, and a third pipe 10 extending from the bottom of the receptacle to the outside thereof.

9. A device of the class specified, comprising an upper receptacle 1, in the form of a bottle, a lower receptacle 2, adapted to receive the lower portion of the receptacle 1, a pipe 7 extending downwardly from the top of the bottle 1 through the mouth at the bottom of the same and thence upwardly to the top of the receptacle 2, thence downwardly from the same, a second pipe 12 extending upwardly from the interior of the receptacle 2, and thence over the top of the same and thence downwardly, and a third pipe 10 extending upwardly from the bottom of the receptacle 2 to the top thereof, and thence downwardly over the same.

10. A device of the class specified, having upper and lower receptacles, the former arranged to fit within the latter, and a bracket arrangement for supporting said receptacles having portions 21 and 23 adapted to fit in corresponding recesses in the top and bottom of said receptacles.

11. A device of the class specified, comprising upper and lower receptacles, the upper receptacle being arranged to supply the lower receptacle with liquid, and means for drawing liquid from the lower receptacle, and also for supplying liquid thereto for recharging or refilling.

12. In a device of the character described, the combination with a main reservoir, of an auxiliary reservoir, means for transferring liquid from said main reservoir to said auxiliary reservoir and air to said main reservoir, and means for filling said main reservoir through said auxiliary reservoir.

13. In a device of the character described, a main reservoir, an auxiliary reservoir communicating therewith, means for maintaining a predetermined level of liquid in said auxiliary reservoir, means for supporting said reservoirs, a tube extending to the top of said main reservoir and through said auxiliary reservoir, adapted for exhausting air from the main reservoir, and means for preventing atmospheric air from entering said main reservoir through said tube.

14. In a device of the character described, a main reservoir, an auxiliary reservoir communicating therewith, means for maintaining a predetermined level of liquid in said auxiliary reservoir, means for supporting said reservoirs, a tube extending to the top of said main reservoir and through said auxiliary reservoir, adapted for exhausting air from said main reservoir, and means for preventing atmospheric air from entering said main reservoir through said tube, said last-aforesaid means consisting of an aperture in said tube submerged in the liquid of said auxiliary reservoir.

15. A device of the class specified, comprising upper and lower coöperating liquid holding reservoirs arranged to maintain a constant liquid feed level, said upper reservoir having an aperture in its bottom, and a pipe extending from the exterior of said reservoirs through said aperture to the upper part of the interior of said upper reservoir.

16. A device of the class specified, comprising in combination upper and lower liquid receptacles, said upper receptacle having a groove in one side extending from above the top of the lower receptacle to the lower edge of said upper receptacle, and pipes extending from the exterior of said receptacles through said groove to the interior of said receptacles.

17. In a device of the class described in combination, upper and lower liquid receptacles, the top of said upper receptacle and the bottom of said lower receptacle having recesses therein, and bracket arms arranged within said recesses.

In witness whereof, I hereunto subscribe my name this 2nd day of February A. D., 1911.

JULIAN G. GOODHUE.

Witnesses:
A. LYDA JONES,
HAZEL JONES.